(12) United States Patent
Liu

(10) Patent No.: US 11,886,592 B2
(45) Date of Patent: Jan. 30, 2024

(54) SECURE FIRMWARE UPDATE THROUGH A PREDEFINED SERVER

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 231 days.

(21) Appl. No.: 17/399,919

(22) Filed: Aug. 11, 2021

(65) Prior Publication Data

US 2023/0046674 A1 Feb. 16, 2023

(51) Int. Cl.
| | |
|---|---|
| *G06F 11/00* | (2006.01) |
| *G06F 21/57* | (2013.01) |
| *G06F 8/65* | (2018.01) |
| *H04L 9/32* | (2006.01) |
| *G06F 9/4401* | (2018.01) |
| *G06F 11/14* | (2006.01) |
| *G06F 8/71* | (2018.01) |

(52) U.S. Cl.
CPC .............. *G06F 21/572* (2013.01); *G06F 8/65* (2013.01); *G06F 8/71* (2013.01); *G06F 9/4406* (2013.01); *G06F 11/1433* (2013.01); *G06F 11/1448* (2013.01); *G06F 11/1469* (2013.01); *H04L 9/3247* (2013.01); *G06F 2201/82* (2013.01); *G06F 2221/033* (2013.01)

(58) Field of Classification Search
CPC ............. G06F 11/1433; G06F 11/1448; G06F 11/1469; G06F 21/572; G06F 8/65; H04L 9/3247

See application file for complete search history.

(56) References Cited

U.S. PATENT DOCUMENTS

| | | | | |
|---|---|---|---|---|
| 2007/0055969 | A1* | 3/2007 | Yang | G06F 11/1433 717/168 |
| 2016/0210132 | A1* | 7/2016 | Gerhart | G06F 8/65 |
| 2019/0042278 | A1* | 2/2019 | Pirvu | G06F 9/4411 |
| 2019/0042754 | A1* | 2/2019 | Jreij | G06F 21/575 |
| 2022/0100489 | A1* | 3/2022 | Hung | G06F 11/0757 |

OTHER PUBLICATIONS

Juhasz, Marton, Secure remote firmware update on embedded IoT devices, Dec. 10, 2020, Budapest University of Technology and Economics (Year: 2020).*

Mansor, Hafizah et al., Don't Brick Your Car: Firmware Confidentiality and Rollback for Vehicles, 2015, IEEE (Year: 2015).*

* cited by examiner

*Primary Examiner* — Marc Duncan

(74) *Attorney, Agent, or Firm* — Greenberg Traurig

(57) ABSTRACT

The disclosed embodiments relate to securely booting firmware images. In one embodiment, a method is disclosed comprising receiving, by a memory device, a firmware update; validating, by the memory device, a signature associated with the firmware update; copying, by the memory device, an existing firmware image to an archive location, the archive location storing a plurality of firmware images sorted by version identifiers; booting, by the memory device, and executing the firmware update; and replacing, by the memory device, the firmware update with the existing firmware image stored in the archive location upon detecting an error while booting the firmware update.

20 Claims, 6 Drawing Sheets

SECURE FIRMWARE UPDATE THROUGH A PREDEFINED SERVER

TECHNICAL FIELD

At least some embodiments disclosed herein relate to memory devices in general, and more particularly, but not limited to authenticating to securing input/output (I/O) operations in a memory device.

BACKGROUND

A memory subsystem can include one or more memory devices that store data. The memory devices can be, for example, non-volatile memory devices and volatile memory devices. A host system can utilize a memory subsystem to store data at the memory devices and retrieve data from the memory devices.

BRIEF DESCRIPTION OF THE DRAWINGS

The embodiments are illustrated by way of example and not limitation in the figures of the accompanying drawings in which identical references indicate similar elements.

DETAILED DESCRIPTION

Figure 1:
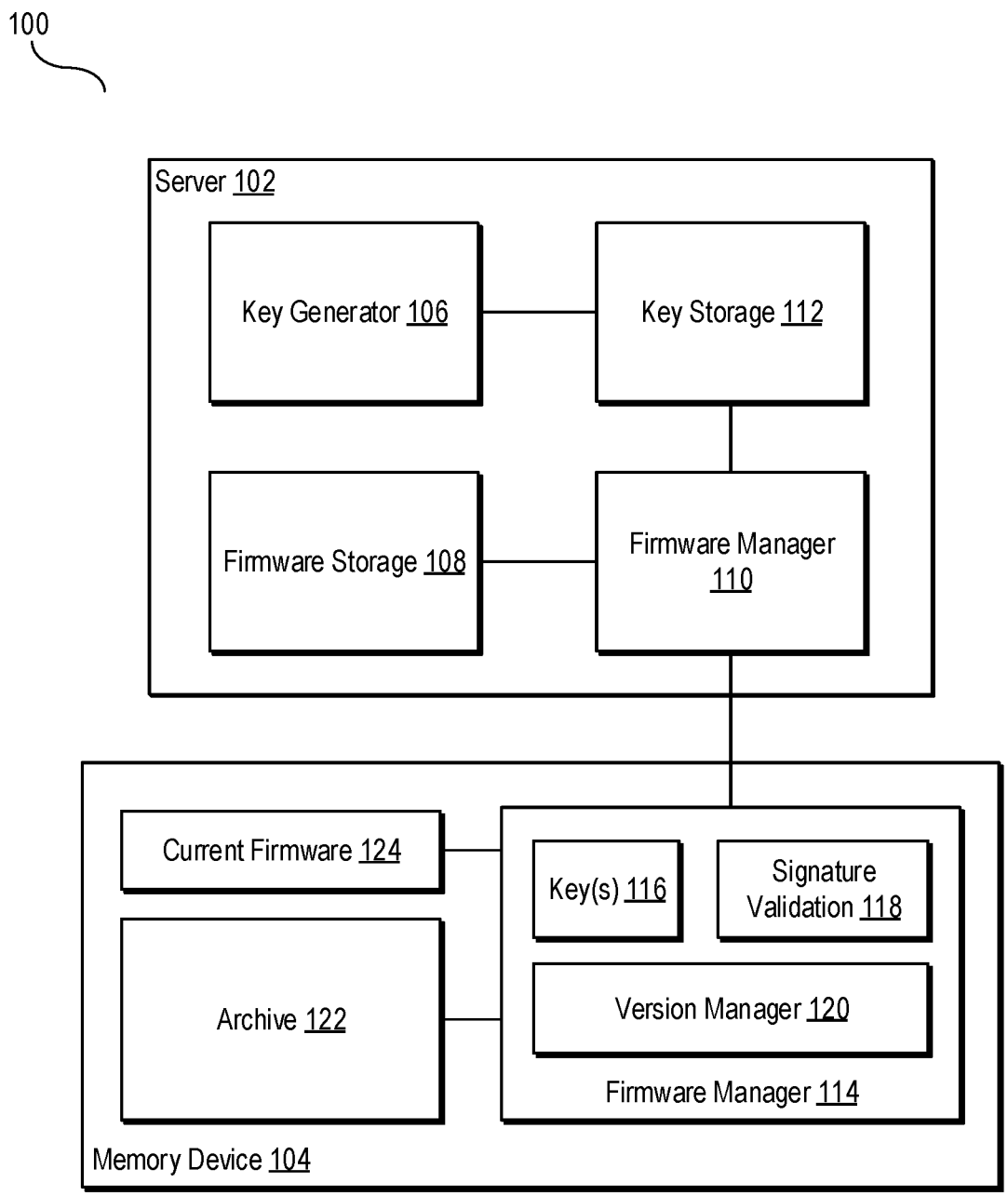
FIG. 1 is a block diagram of a system for providing verified firmware updates according to some embodiments.

In one embodiment, a storage device can include a secure area that stores an initial version of firmware code and a public key of a server. The secure area can be write-protected to prevent tampering. The server can sign an updated version of the firmware stored, at first, by the server. The updated version can then be loaded into a write-enabled area of the storage device for flashing. Firmware stored into the storage device can be assigned with increasing version numbers in, for example, a table or via file-naming conventions. The version numbers may be assigned by the server. The authenticity of the downloaded firmware can be verified via the public key of the server that is stored in the secure area of the storage device. The storage device can be configured to boot using the firmware with the highest version number. When the booting from the highest version fails, the system can invalidate or erase the corrupted version and boot from the next version. Alternatively, instead of downloading the updated firmware directly, a management tool can obtain the digital signature associated with the updated version from the predefined server and provide the signed version for flashing.

During manufacturing, a manufacturer can generate a public/private key pair. In some embodiments, this key pair is generated per memory device and thus associated with a memory device (e.g., associated with a unique identifier of the memory device). The manufacturer can then write the key pair to a secure area of the storage device (e.g., a write-protected region of non-volatile storage). The manufacturer additionally can select (or generate) a firmware image. In one embodiment, the manufacturer can assign an initial firmware version to the firmware image. The manufacturer can record this version information in a database or similar storage medium. Finally, the manufacturer can write the initial firmware to the memory device and releases the device to manufacturing (i.e., to customers).

In some embodiments, the initial firmware can be upgraded to the new firmware. In one embodiment, a memory device can initiate a firmware update. This can be done by a server informing the memory device of a new version of the firmware or by the memory device actively requesting an update. In one embodiment, the memory device can provide a unique identifier or other identifying value in the request for new firmware. In other embodiments, a management tool can be used to initiate a firmware update and receive the update. In such an embodiment, the memory device can receive the signed updated firmware from the management tool and not directly from the server.

In response, the server can generate or retrieve updated firmware. The server can load the current version number and increment the version number. The server can then store this incremented version number as the latest version. The server can locate the private key associated with the memory device. Finally, the server can sign the firmware with the private key and transmit the firmware to the memory device.

Upon receiving a signed firmware update, the memory device can load the public key from non-volatile storage and validate the signature of the updated firmware. If the validation fails, the memory device can discard the updated firmware. If the validation passes, the memory device can copy the current firmware to an archive location. In one embodiment, this archive location can comprise a write-protected location. The memory device can further update a version table that maps firmware versions to archive locations. In some embodiments, a file-naming convention can be used to track firmware versions instead of a separate table. After moving the current firmware, the memory device can replace the current firmware with the new firmware. In some embodiments, the firmware may not be replaced in such a fashion. Specifically, in some embodiments, a small, first-stage bootloader may be configured to find the latest firmware version (e.g., using the table or file naming convention) and transfer control to the latest version of the firmware.

After replacing the current firmware, the memory device can (later or immediately) restart. On restarting, the memory device can run the latest version of the firmware. The memory device can detect if any boot errors have occurred when running the latest version. If no errors occur, the process can end, and the memory device can boot. However, if an error occurs, the memory device can load the previous version of firmware and attempt to run that version. This process can repeat (e.g., decrementing the version number) until the memory device boots. Since the initial firmware can reasonably be guaranteed as secure, the memory device can ultimately boot-up regardless of errors loading later firmware (i.e., by loading the firmware written by the manufacturer during manufacturing).

The disclosed embodiments provide a more efficient firmware update procedure and thus reduce the cost of device firmware updates (e.g., in Internet-of-Things devices). The illustrated embodiments further provide a more secure update procedure and make server-initiated firmware updates both more secure and more efficient. The illustrated embodiments further reduce the costs of system maintenance.

FIG. 1 is a block diagram of a system for providing verified firmware updates according to some embodiments.

In the illustrated embodiment, system 100 includes a memory device 104 and server 102 that are communicatively coupled. In an embodiment, the memory device 104 can request firmware images from server 102 and receive such images. As discussed, server 102 and memory device 104 coordinate the versioning of firmware images and the secure deployment of firmware images.

In an embodiment, server 102 includes a key generator 106. In one embodiment, the key generator 106 is configured to generate a key pair. In one embodiment, the key pair can comprise an asymmetric key pair. As such, in some embodiments, the key pair can comprise a public/private key pair. For example, a Rivest-Shamir-Adleman (RSA) or Elliptic Curve Cryptography (ECC) key generation algorithm can be used to generate public/private key pairs. The key generator 106 can write the keys to key storage 112. In one embodiment, key storage 112 can comprise a hardware security module (HSM) or a similar trusted storage device. In one embodiment, the key storage 112 can store both the public and private keys of a key pair. In another embodiment, the key storage 112 can only store the private key of the key pair.

Server 102 can further include firmware storage 108. In one embodiment, firmware storage 108 stores firmware images. In one embodiment, the images can comprise full firmware images or can comprise path or "update" files. In one embodiment, each firmware image can be associated with a version identifier generated by firmware manager 110.

Server 102 can further include a firmware manager 110. In an embodiment, firmware manager 110 can be configured to prepare firmware images. In one embodiment, the firmware manager 110 retrieves firmware images from firmware storage 108. In one embodiment, the firmware manager 110 can generate firmware images based on, for example, base firmware images stored in firmware storage 108. In one embodiment, the firmware manager 110 can further write firmware images directly to a memory device. In such an embodiment, firmware manager 110 may have direct access to a memory device (e.g., in a manufacturing environment).

Figure 2:
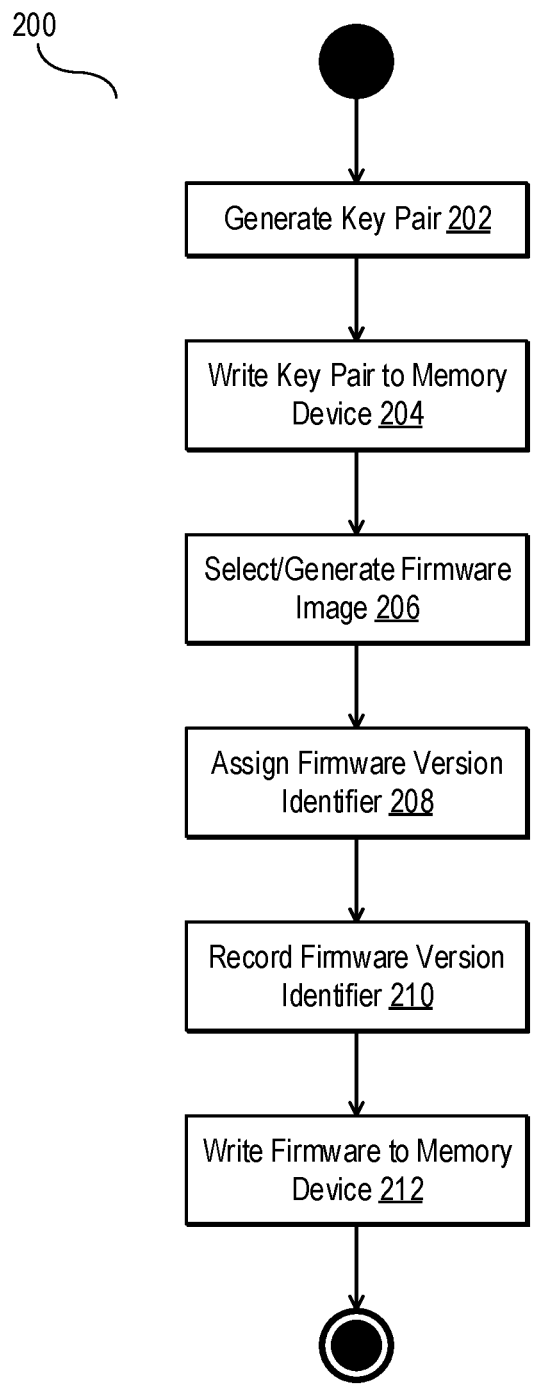
FIG. 2 is a flow diagram illustrating a method for initializing a memory device according to some embodiments.

Further detail regarding the operations performed by the firmware manager 110 with respect to firmware management can be found in the description of FIG. 2, which is not repeated herein.

In one embodiment, the firmware manager 110 can further respond to requests for updating firmware. In one embodiment, the firmware manager 110 can further include a network interface allowing for remote requests for firmware images and the transmittal of responsive firmware images to memory devices. In one embodiment, firmware manager 110 can include digital signature logic for reading a private key from key storage 112 and generating a digital signature for a given firmware. In one embodiment, this private key in key storage 112 can be identified to match the requesting memory device. In one embodiment, firmware manager 110 can be configured to assign the version identifier of the updated firmware to the memory device 104 and store this mapping persistently to enable sequential updates.

Figure 3:
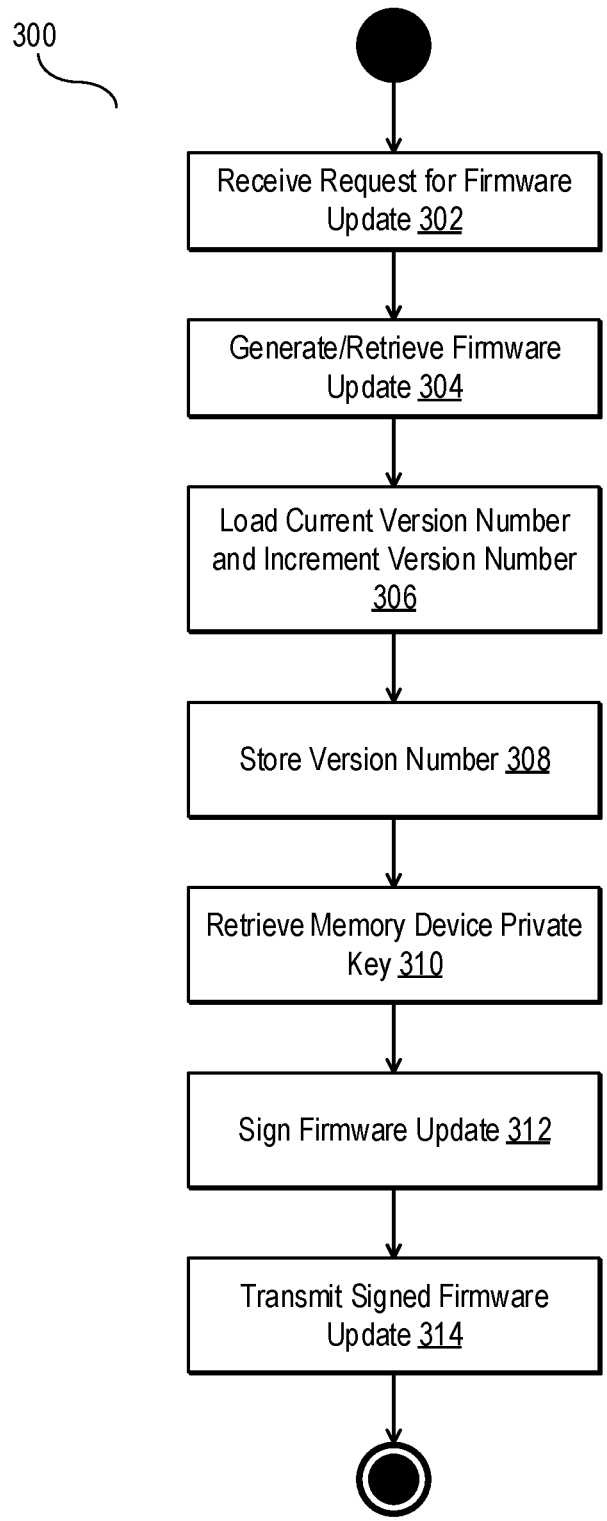
FIG. 3 is a flow diagram illustrating a method for updating the firmware of a memory device according to some embodiments.

Further detail regarding the operations performed by the firmware manager 110 with respect to firmware updates can be found in the description of FIG. 3, which is not repeated herein.

In the illustrated embodiment, a memory device 104 includes a firmware manager 114, current firmware location 124, and archive location 122. In the illustrated embodiment, archive location 122 and current firmware location 124 can comprise portions of non-volatile storage of the memory device 104. In one embodiment, archive location 122 and current firmware location 124 can comprise write-protected regions of a persistent storage array. In one embodiment, current firmware location 124 is configured to store an active firmware image that the memory device 104 executes upon boot. Conversely, archive location 122 can be configured to store historical firmware images previously used by the memory device 104. In one embodiment, the archive location 122 stores the historical images in a sorted order based on a corresponding version identifier. In some embodiments, current firmware location 124 comprises a logical location rather than a separate physical location and can comprise the location of the firmware having the highest version number.

In the illustrated embodiment, firmware manager 114 includes a public key 116. In one embodiment, public key 116 comprises a key generated by key generator 106 and written to the memory device 104 during manufacturing. In some embodiments, firmware manager 114 can also store a corresponding private key. In an embodiment, signature validation logic 118 can be configured to verify signed firmware images received from server 102. Details of this operation are discussed in more detail in blocks 406 and 408 of FIG. 4.

The firmware manager 114 further includes a version manager 120. In an embodiment, version manager 120 is configured to receive valid firmware images and update current firmware location 124. In one embodiment, version manager 120 updates the current firmware location 124 by copying the current firmware in current firmware location 124 to the archive location 122 and copying a new firmware image to the current firmware location 124. Details of this operation are provided in blocks 412, 414, 416, and 418 of FIG. 4.

In one embodiment, the firmware manager 114 can further be configured to restart memory device 104 after copying new firmware to current firmware location 124. In one embodiment, firmware manager 114 is further configured to determine if one or more errors or warnings occur during booting. If so, firmware manager 114 can instruct the version manager 120 to roll back a firmware update. In one embodiment, version manager 120 can roll back a firmware update by loading the most recently archived firmware image in archive location 122 and copying the most recently archived firmware image to current firmware location 124. Details of this operation are provided in blocks 416, 418, 420, 422, and 424 of FIG. 4.

FIG. 2 is a flow diagram illustrating a method for initializing a memory device according to some embodiments. In one embodiment, method 200 can be performed by a manufacturer of a memory device. For example, method 200 can be performed by the manufacturer prior to releasing a memory device to a customer or other downstream party.

In block 202, method 200 can comprise generating a key pair.

In one embodiment, the key pair can comprise an asymmetric key pair. As such, in some embodiments, the key pair can comprise a public/private key pair. For example, an RSA or ECC key generation algorithm can be used to generate public/private key pairs. In some embodiments, method 200 can comprise registering the public key of the key pair with a CA or similar trusted entity.

In one embodiment, method 200 can store the key pair in a secure storage location such as an HSM. In one embodiment, method 200 can store both the public and private keys of a key pair. In another embodiment, method 200 can only store the private key of the key pair.

In one embodiment, method 200 can generate a new key pair for each memory device. Thus, in such an embodiment, each key pair is uniquely associated with a given memory device. In one embodiment, method 200 can use a unique identifier associated with the memory device as part of the key generation process. For example, a globally unique identifier (GUID) for a memory device can be used to seed a key generation algorithm (e.g., in lieu of a random or pseudo-random number). In alternative embodiments, method 200 can persist a unique identifier of a memory device along with the key pair. For example, the unique identifier and key pair can be stored as a single record in a secure database table. Method 200 can use other techniques provided that a given key pair for a given unique identifier of a memory device can be accessed.

In block 204, method 200 can comprise writing the key pair to a memory device.

In one embodiment, method 200 can comprise writing the key pair to a secure area of a memory device. In one embodiment, method 200 can comprise writing the key pair to a write-protected area of the memory device. In one embodiment, the secure area of the memory device can comprise a secure area of a persistent storage area (e.g., NAND Flash array). In some embodiments, method 200 can execute block 204 during the manufacturing process of the memory device.

In block 206, method 200 can comprise selecting or generating a firmware image.

In one embodiment, method 200 can comprise using a unique identifier or product type identifier of the memory device to query a database of firmware images. In one embodiment, method 200 can comprise retrieving a base firmware image and modifying the base firmware image based on the properties of the memory device to generate a final firmware image. In one embodiment, the firmware image can comprise a first-stage bootloader. However, in other embodiments, the firmware may include second or later-stage code.

In block 208, method 200 can comprise assigning a firmware version identifier to the firmware image selected or generated in block 206.

In one embodiment, method 200 can comprise initializing a firmware version to a fixed value (e.g., zero or one) for each memory device and associating this fixed value as the firmware version for the firmware image selected or generated in block 206. Thus, the firmware image selected or generated in block 206 is always labeled with an initial version identifier of each memory device.

In another embodiment, method 200 can utilize a global version identifier as the firmware version. In this embodiment, the version of the firmware image selected or generated in block 206 is created independently of method 200. For example, a development team can release versions of the firmware images and increment a version identifier for each release. Thus, when method 200 selects or generates the firmware image in block 206, method 200 can also receive the version identifier. In one embodiment, method 200 may use the global version identifier despite modifying the firmware image associated with the global version identifier. Thus, even if method 200 modifies the base firmware image, it may retain the global version identifier. Alternatively, in some embodiments, method 200 can append a per-memory device value to the global version identifier to signify that a base firmware image has been modified prior to writing to the memory device. In some embodiments, this per-memory device value can be generated based on the unique identifier of the memory device. Thus, different memory devices with the same base firmware image can have different version numbers based on this appended value.

In block 210, method 200 can comprise recording the firmware version identifier.

In one embodiment, method 200 can write the firmware version identifier to a persistent data store such as a database. In one embodiment, method 200 can write the firmware version identifier along with the key pair and unique identifier. Thus, method 200 can write a three-item tuple comprising a unique identifier, key pair, and firmware version identifier for each memory device released to customers.

In block 212, method 200 can comprise writing the firmware to the memory device. In one embodiment, method 200 can write the selected (or generated) firmware to a secure storage area of the memory device, such as the write-protected region of the memory device. In one embodiment, method 200 can write the firmware to a bootable location of the memory device such that the memory device will execute the firmware upon booting up after being released by the manufacturer. In one embodiment, described in more detail in connection with block 312 of FIG. 3, method 200 can sign the firmware prior to writing the firmware.

FIG. 3 is a flow diagram illustrating a method for updating the firmware of a memory device according to some embodiments.

In block 302, method 300 can comprise receiving a request for a firmware update.

In some embodiments, an initial firmware written using method 200 can be upgraded to a new firmware image. In one embodiment, a memory device can initiate a firmware update. In one embodiment, this can be done by a server informing the memory device of a new version of the firmware or by the memory device actively requesting an update. In some embodiments, method 300 receives the request for firmware updates via an application programming interface (API) or another network interface. In one embodiment, the memory device provides a unique ID or other identifying value in the request for new firmware. In some embodiments, this unique ID is stored by the memory device in a secure (e.g., write-protected) area.

In other embodiments, a management tool can be used to initiate a firmware update and receive the update. In such an embodiment, the memory device will receive the signed updated firmware from the management tool and not directly from the server.

In block 304, method 300 can comprise generating or retrieving a firmware update.

In one embodiment, method 300 can identify a current version of the firmware executing on the memory device issuing the request in block 302. In one embodiment, the current version can be included in the request. In other embodiments, method 300 can query a data store of a memory device to firmware mappings to identify a current version.

In one embodiment, method 300 can then determine if a newer firmware version supported by the memory device exists. If so, method 300 can use a newer firmware version as the firmware update. In one embodiment, method 300 can choose the next firmware version or the latest firmware version. In some embodiments, method 300 can select the latest or next firmware version supported by the memory device.

In one embodiment, method 300 can comprise retrieving a base firmware update image and modifying the base firmware update image based on the properties of the memory device to generate a final firmware update image. In one embodiment, the firmware update image can comprise a first-stage bootloader. However, in other embodiments, the firmware update may include second or later-stage code.

In block 306, method 300 can comprise loading a current firmware version identifier and updating the firmware version identifier. In some embodiments, method 300 can perform block 306 concurrently or as part of block 304. As described in the description of method 200, a server can maintain a record of firmware version identifiers for each memory device. Thus, in block 306, method 300 can query this record using, for example, a unique ID of a memory device and load the current version.

Next, method 300 can update the firmware version identifier of the memory device. In one embodiment, method 300 can associate an incremented version identifier as the firmware version for the firmware update image selected or generated in block 304. Thus, the firmware update image selected or generated in block 304 is always labeled with an incremented version identifier. Alternatively, method 300 can increment a global version identifier as the firmware update version. In this embodiment, the version of the firmware update image selected or generated in block 304 is created independently of method 300. For example, a development team can release versions of the firmware update images and increment a version identifier for each release. Thus, when method 300 selects or generates the firmware update image in block 304, method 300 can also receive the version identifier. In one embodiment, method 300 may use the global version identifier despite modifying the firmware update image associated with the global version identifier. Thus, even if method 300 modifies the base firmware update image, it may retain the global version identifier. Alternatively, in some embodiments, method 300 can append a per-memory device value to the global version identifier to signify that a base firmware update image has been modified prior to writing to the memory device. In some embodiments, this per-memory device value can be generated based on the unique identifier of the memory device. Thus, different memory devices with the same base firmware update image can have different version numbers based on this appended value.

In block 308, method 300 can comprise storing the updated firmware version identifier.

In one embodiment, method 300 can write the updated firmware version identifier to a persistent data store such as a database. In one embodiment, method 300 can write the updated firmware version identifier along with the key pair and unique identifier. Thus, method 300 can write a three-item tuple comprising a unique identifier, key pair, and updated firmware version identifier for each memory device. As illustrated, this tuple can be used in block 306 to continuously update the firmware version identifier.

In block 310, method 300 can comprise retrieving a private key associated with a memory device requesting the firmware update.

In one embodiment, method 300 can access an HSM or similar device to load a private key. In one embodiment, method 300 extracts a unique ID from the request in block 302 and uses this unique ID to load the private key. As discussed, the private key may be part of a key pair generated for each memory device. In some embodiments, a key change facility can be provided to allow customers to change the key pair in a secure manner. In any scenario, the private key loaded in method 300 can be used to secure communications between the memory device and server executing method 300.

In block 312, method 300 can comprise signing the firmware update. In one embodiment, method 300 uses the private key associated with a memory device issuing a request for a firmware update to sign the firmware update. In an embodiment, method 300 can use a corresponding signature algorithm to generate a digital signature using the firmware update (or a digest thereof) as the input to the signature algorithm. For example, method 300 can use an RSA signature algorithm or Elliptic Curve Digital Signature Algorithm (ECDSA) to generate a digital signature using the firmware update image (or a digest thereof) and the private key.

In block 314, method 300 transmits the signed firmware to the memory device. In some embodiments, method 300 can transmit the firmware image and the signature. In some embodiments, method 300 can further transmit the newly generated version identifier. As will be discussed next, after receiving the signed firmware update, the memory device can verify the update, load the update, and attempt to reboot using the update.

Figure 4:
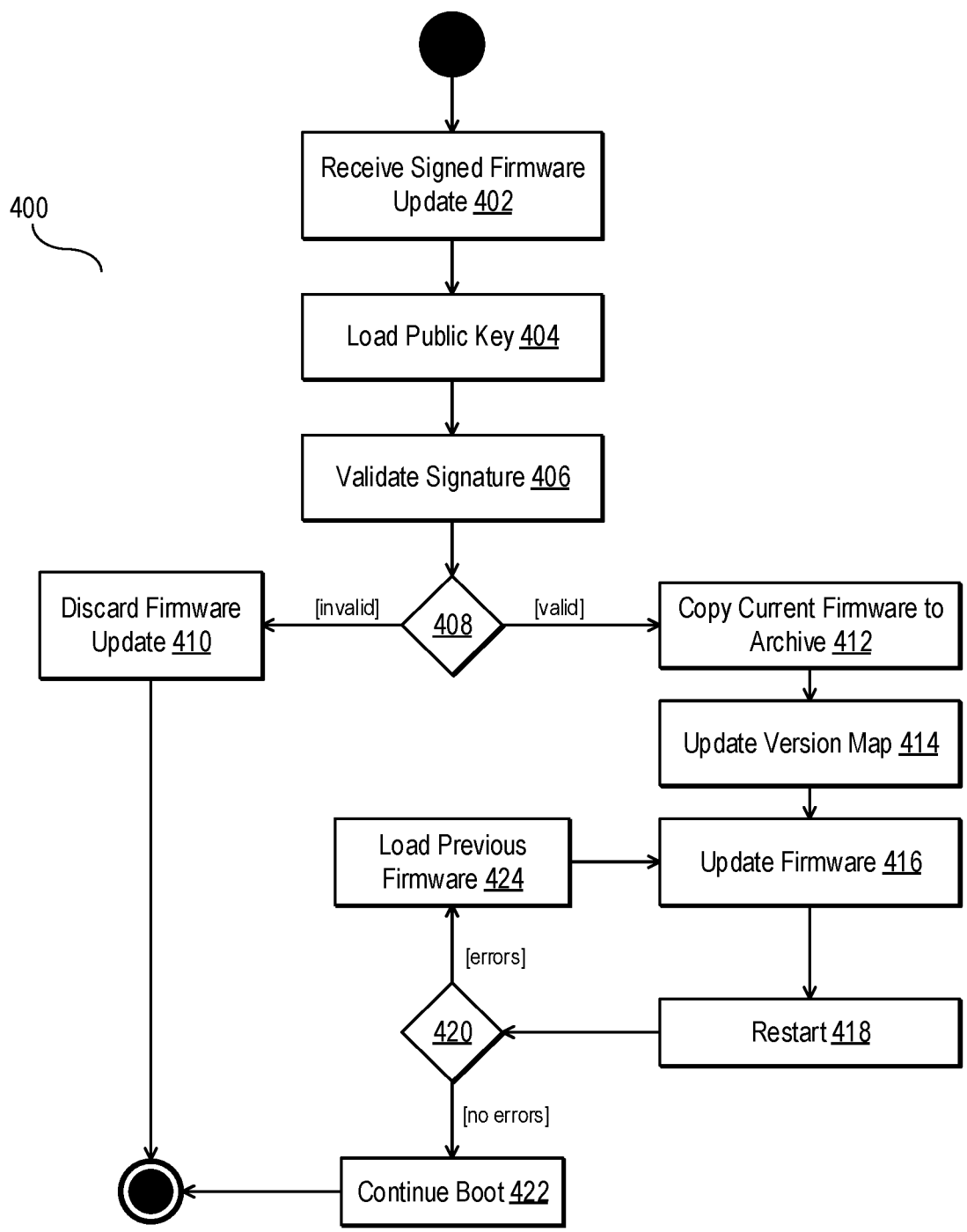
FIG. 4 is a flow diagram illustrating a method for validating the firmware of a memory device during a boot process according to some embodiments.

FIG. 4 is a flow diagram illustrating a method for validating the firmware of a memory device during a boot process according to some embodiments.

In block 402, method 400 can comprise receiving a signed firmware update. In one embodiment, the signed firmware update includes a firmware update image and a digital signature. In some embodiments, the signed firmware update further includes a version identifier. In some embodiments, method 400 can receive the signed firmware update from a remote server according to the embodiments described in connection with FIG. 3.

In block 404, method 400 can comprise loading a public key. In one embodiment, method 400 can read the public key from a non-volatile storage location. In some embodiments, this non-volatile storage location can comprise a write-protected storage location of a memory device, such as a NAND Flash device.

In block 406, method 400 can comprise verifying a digital signature of the firmware update using the public key. In one embodiment, method 400 can comprise computing a digest (e.g., hash) of the firmware update image. Next, method 400 can decrypt the received signature using the public key. In block 408, method 400 determines if the signature is valid or invalid. In one embodiment, the signature is determined to be invalid if the decrypted signature does not equal the expected digest (e.g., hash) of the firmware update image.

In block 410, if method 400 cannot validate the digital signature of the firmware update, method 400 can discard the firmware update (e.g., erase the firmware update image from non-volatile storage). Alternatively, if method 400 validates the digital signature, method 400 can proceed to block 412.

In block 412, method 400 comprises copying the current firmware image to an archived location. In one embodiment, method 400 can comprise copying the current firmware image to a persistent storage area of a memory device. In one embodiment, method 400 can comprise copying the current firmware image to a write-protected region of a persistent storage area of a memory device. In one embodiment, method 400 can write to the write-protected region via a secure command to enable and disable write protection for a region of memory. In one embodiment, this secure command can be signed by the issuer and verified by method 400 prior to processing the command. In other embodiments, dedicated commands for reading or writing to a write-protected region may be provided and verified via digital signatures as well. In one embodiment, the current firmware image comprises the currently executing firmware of the memory device.

In block 414, method 400 can comprise updating a version map.

In one embodiment, method 400 manages a version identifier mapping, the mapping comprising an association of version identifiers to firmware images. In one embodiment, method 400 can manage this mapping via a relational structure such as a key-value mapping or a database table. In another embodiment, method 400 can manage version identifiers via filenames or other suitably sortable mechanisms. In one embodiment, method 400 can utilize a memory array ordering to manage version identifiers. For example, the archived location may comprise a set of memory addresses configured to operate as a stack, wherein the latest firmware image copied to the archived location is placed at the top of the stack.

In one embodiment, method 400 maintains a listing of all firmware images written to a designated location (e.g., boot partition) via the version map. In one embodiment, the version map thus stores an incremented version number for each firmware image written to the memory device.

In block 416, method 400 updates the current firmware image with the firmware update image received in block 402. In one embodiment, after method 400 archives the firmware and updates a version identifier mapping, method 400 can remove the current firmware from a designated location (e.g., boot partition) and write the firmware update image to the same designated location. In other embodiments, method 400 can patch the current firmware with the firmware update image. In another embodiment, method 400 can overwrite the current firmware image with the firmware update image.

In block 418, method 400 initiates a restart of the memory device. In one embodiment, method 400 can initiate a software-initiated restart which causes a power cycle of the memory device. After initiating the restart, method 400 will attempt to load and execute the firmware update as part of a boot sequence.

In block 420, method 400 determines if any errors occurred during a boot sequence. In one embodiment, an error includes a validation error, wherein the validation error comprises a failure of the memory device to verify a digital signature of the firmware update image. In such a scenario, method 400 cannot guarantee the integrity of the firmware image since writing the image in block 416. As one example, the code of the firmware update may have been maliciously modified since the initial write in block 416, and thus method 400 cannot verify a signature (e.g., using the same process as block 406). In another embodiment, an error can include a logical error in the firmware update. In one embodiment, method 400 can verify the integrity of the firmware update, but the firmware update may encounter one or more errors or "bugs" when attempting to execute. In one embodiment, method 400 can trap such errors or exceptions in block 420. In general, any error handling technique can be used to intercept such errors, which, in current devices, simply cause a memory device to cease functioning. As another embodiment, method 400 can determine that the operations of the firmware update image erroneously write or read from a storage medium. As another example, method 400 can determine if any warnings or other non-critical conditions occur as part of block 420. In some embodiments, method 400 can perform all or combinations of the foregoing error or warning checks. Generally, method 400 can capture any error or condition that would prevent a memory device from successfully booting.

In block 422, if method 400 determines that no errors occurred in block 420, method 400 continues to boot normally. In one embodiment, block 422 can comprise executing next-stage bootloader code, operating system code, or application layer code (or combinations thereof). In general, any boot sequence can continue to be executed upon passing the determination in block 420. In one embodiment, method 400 can perform the determination in block 420 for each stage. In such an embodiment, method 400 can be modified to store separate version mappings for each stage.

In block 424, alternatively, if method 400 determines that errors occurred in block 420, method 400 loads a previous firmware image.

In one embodiment, the executed firmware image includes a version identifier that comprises an integer value. In blocks 424, 416, and 420, method 400 iteratively decrements the version identifier and uses the version map (block 414) to successively load previous firmware images. As illustrated, once method 400 successfully executes a firmware image in block 420, method 400 will continue a boot process. Although integer values are used, the disclosure is not limited as such. Indeed, semantic versioning, floating-point values, or other values can be used provided that the values can be sorted in some manner.

In other embodiments, method 400 can use other techniques other than decrementing an integer value. For example, a version identifier can comprise a major version and a minor version (e.g., major version 1, minor version 2, or 1.2). In some embodiments, method 400 can utilize a patch version as well (e.g., 1.2.3, with patch version 3). In such an embodiment, method 400 can select a previous version based on the type of error or warning. For example, if only a warning occurred, method 400 can roll back a patch or minor version to the previous version. However, if a critical error occurred, method 400 can roll back to a previous major version.

In another embodiment, method 400 utilizes a stack structure to store firmware images. Thus, in block 424, method 400 pops the top firmware image of the stack, which corresponds to the previous firmware image. In this manner, version identifier information need not be explicitly stored.

In one embodiment, method 400 can discard any firmware image that caused an error in block 420. Since such firmware inherently includes errors or problematic code, method 400 may completely discard or erase the firmware from the archived location and remove the version mapping. If a stack is used, method 400 may inherently remove the previous firmware version from the archived location. However, method 400 may also affirmatively remove the previous firmware version from the archived location in other embodiments.

Figure 5:
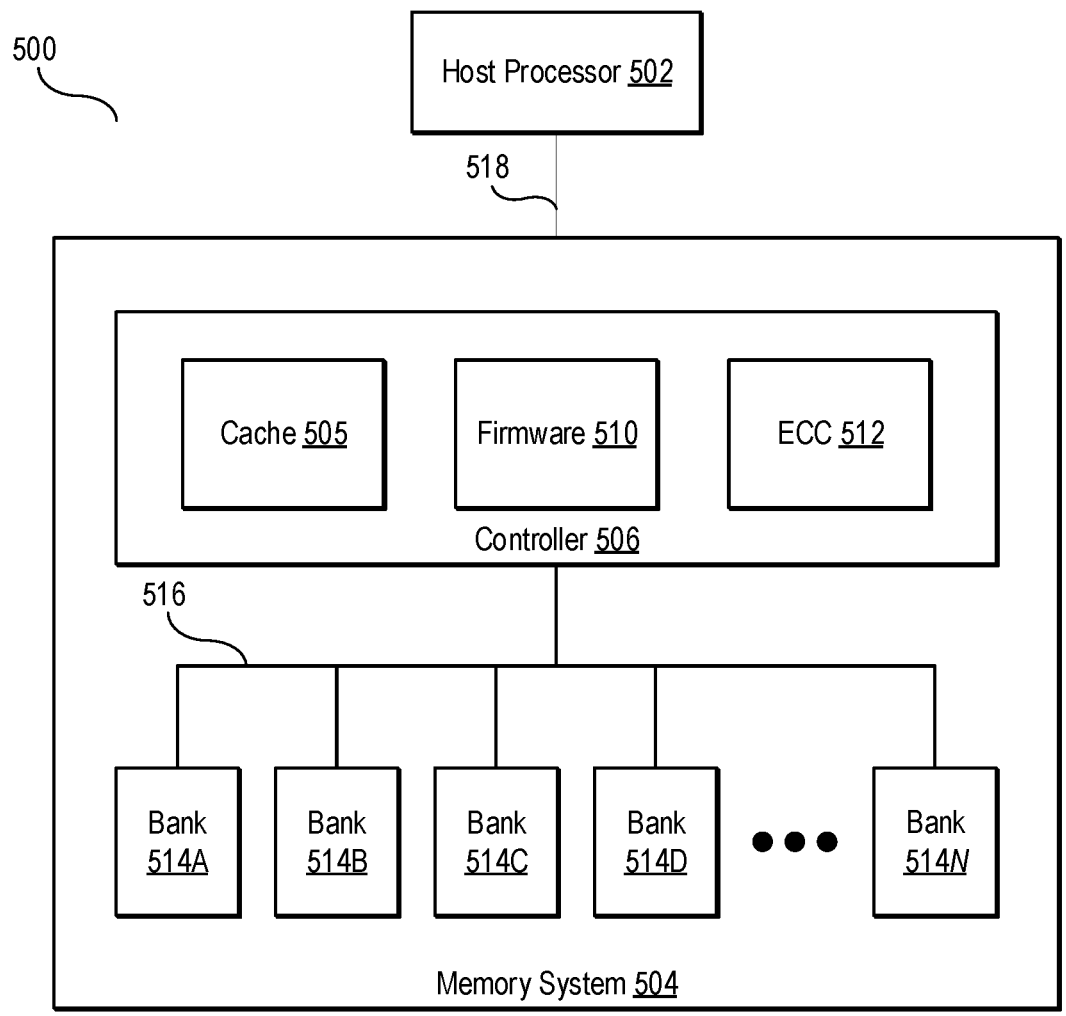
FIG. 5 is a block diagram illustrating a memory system according to some embodiments.

FIG. 5 is a block diagram illustrating a memory system according to some embodiments. Various features of FIG. 5 have been described logically in the description of FIG. 1, and those features are incorporated herein by reference in their entirety.

As illustrated in FIG. 5, a computing system 500 includes a host processor 502 communicatively coupled to a memory system 504 via a bus 518. The memory system 504 comprises a controller 506 communicatively coupled to one or more memory banks 514A-514N, forming a memory array via a bus/interface 516. As illustrated, controller 506 includes a local cache 505, firmware 510, and an error correction code (ECC) module 512.

In the illustrated embodiment, a host processor 502 can comprise any type of computer processor, e.g., a central processing unit (CPU), graphics processing unit (GPU), or other types of general-purpose or special-purpose computing devices. The host processor 502 includes one or more output ports that allow for the transmission of address, user, and control data between the host processor 502 and the memory system 504. In the illustrated embodiment, this communication is performed over bus 518. In one embodiment, bus 518 comprises an input/output (I/O) bus or a similar type of bus.

The memory system 504 is responsible for managing one or more memory banks 514A-514N. In one embodiment, the banks 514A-514N comprise NAND Flash dies or other configurations of non-volatile memory. In one embodiment, the memory banks 514A-514N comprise a memory array.

The banks 514A-514N are managed by controller 506. In some embodiments, controller 506 comprises a computing device configured to mediate access to and from banks 514A-514N. In one embodiment, controller 506 comprises an ASIC or other circuitry installed on a printed circuit board housing the banks 514A-514N. In some embodiments, controller 506 may be physically separate from the banks 514A-514N. The controller 506 communicates with the banks 514A-514N over the interface 516. In some embodiments, this interface 516 comprises a physically wired (e.g., traced) interface. In other embodiments, interface 516 comprises a standard bus for communicating with banks 514A-514N.

Controller 506 comprises various modules 505-512. In one embodiment, the various modules 505-512 comprise various physically distinct modules or circuits. In other embodiments, modules 505-512 may completely (or partially) be implemented in software or firmware.

As illustrated, firmware 510 comprises the core of the controller and manages all operations of controller 506. The firmware 510 may implement some or all of the methods described above.

Figure 6:
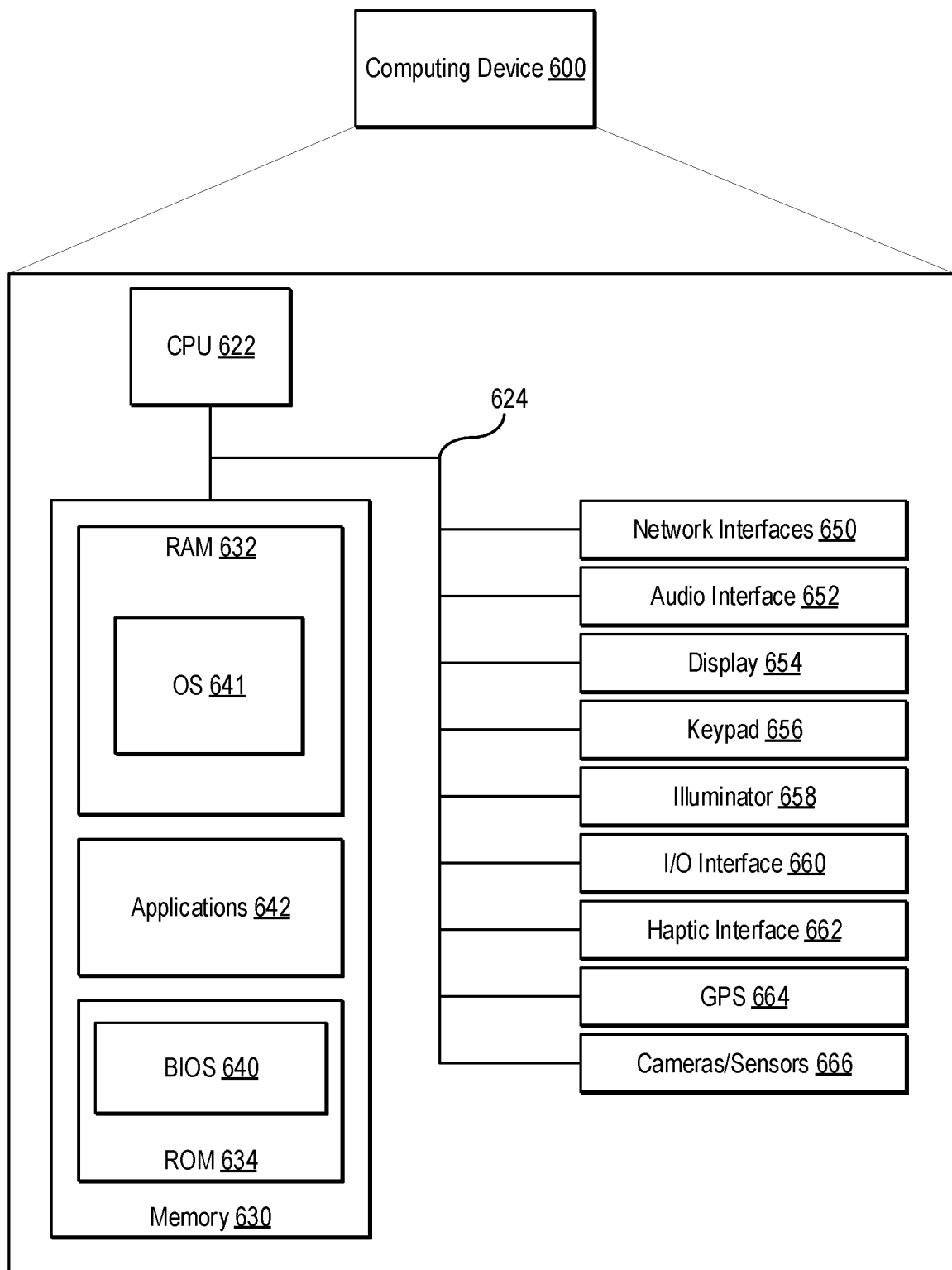
FIG. 6 is a block diagram illustrating a computing device showing an example of a client or server device used in the various embodiments of the disclosure.

FIG. 6 is a block diagram illustrating a computing device showing an example of a client or server device used in the various embodiments of the disclosure.

The device 600 can include more or fewer components than those shown in FIG. 6, depending on the deployment or usage of the device 600. For example, a server computing device, such as a rack-mounted server, may not include an audio interface 652, display 654, keypad 656, illuminator 658, haptic interface 662, Global Positioning System (GPS) receiver 664, or cameras/sensors 666. Some devices can include additional components not shown, such as graphics processing unit (GPU) devices, cryptographic co-processors, artificial intelligence (AI) accelerators, or other peripheral devices.

As shown in the figure, device 600 includes a central processing unit, CPU 622, in communication with a mass memory 630 via a bus 624. The device 600 also includes a network interface 650, an audio interface 652, a display 654, a keypad 656, an illuminator 658, an input/output interface 660, a haptic interface 662, a GPS receiver 664, and camera(s) or other optical, thermal, or electromagnetic sensors such as cameras/sensors 666. Device 600 can include one camera/sensor or a plurality of cameras/sensors 666. The positioning of the cameras/sensors 666 on the device 600 can change per device 600 model, per device 600 capabilities, and the like, or some combination thereof.

In some embodiments, the CPU 622 can comprise a general-purpose CPU. The CPU 622 can comprise a single-core or multiple-core CPU. The CPU 622 can comprise a system-on-a-chip (SoC) or a similar embedded system. In some embodiments, a GPU can be used in place of, or in combination with, a CPU 622. Mass memory 630 can comprise a dynamic random-access memory (DRAM) device, a static random-access memory device (SRAM), or a Flash (e.g., NAND Flash) memory device. In some embodiments, mass memory 630 can comprise a combination of such memory types. In one embodiment, the bus 624 can comprise a Peripheral Component Interconnect Express (PCIe) bus. In some embodiments, bus 624 can comprise multiple busses instead of a single bus.

Mass memory 630 illustrates another example of computer storage media for the storage of information such as computer-readable instructions, data structures, program modules, or other data. Mass memory 630 stores a basic input/output system, BIOS 640, for controlling the low-level operation of the device 600. In the illustrated embodiment, the BIOS 640 may be stored in a read-only memory (ROM) such as ROM 634. The mass memory also stores an operating system 641 for controlling the operation of the device 600.

Applications 642 can include computer-executable instructions which, when executed by the device 600, perform any of the methods (or portions of the methods) described previously in the description of the preceding Figures. In some embodiments, the software or programs implementing the method embodiments can be read from a hard disk drive (not illustrated) and temporarily stored in RAM 632 by CPU 622. CPU 622 can then read the software or data from RAM 632, process them, and store them in RAM 632 again.

The device 600 can optionally communicate with a base station (not shown) or directly with another computing device. Network interface 650 is sometimes known as a transceiver, transceiving device, or network interface card (NIC).

The audio interface 652 produces and receives audio signals such as the sound of a human voice. For example, the audio interface 652 can be coupled to a speaker and microphone (not shown) to enable telecommunication with others or generate an audio acknowledgment for some action. Display 654 can be a liquid crystal display (LCD), gas plasma, light-emitting diode (LED), or any other type of display used with a computing device. Display 654 can also include a touch-sensitive screen arranged to receive input from an object such as a stylus or a digit from a human hand.

Keypad 656 can comprise any input device arranged to receive input from a user. Illuminator 658 can provide a status indication or provide light.

The device 600 also comprises an input/output interface 660 for communicating with external devices, using communication technologies, such as USB, infrared, Bluetooth®, or the like. The haptic interface 662 provides tactile feedback to a user of the client device.

The GPS receiver 664 can determine the physical coordinates of the device 600 on the surface of the Earth, which typically outputs a location as latitude and longitude values. GPS receiver 664 can also employ other geo-positioning mechanisms, including, but not limited to, triangulation, assisted GPS (AGPS), E-OTD, CI, SAI, ETA, BSS, or the like, to further determine the physical location of the device 600 on the surface of the Earth. In one embodiment, however, the device 600 can communicate through other components, provide other information that can be employed to determine the physical location of the device, including, for example, a MAC address, IP address, or the like.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to the desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any programming language. It will be appreciated that a variety of programming languages can be used to implement the teachings of the disclosure as described herein.

The present disclosure can be provided as a computer program product or software that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as read-only memory ("ROM"), random access memory ("RAM"), magnetic disk storage media, optical storage media, flash memory components, etc.

In this description, various functions and operations are described as being performed by or caused by computer instructions to simplify the description. However, those skilled in the art will recognize what is meant by such expressions is that the functions result from the execution of the computer instructions by one or more controllers or processors, such as a microprocessor. Alternatively, or in combination, the functions and operations can be implemented using special-purpose circuitry, with or without software instructions, such as using Application-Specific Integrated Circuit (ASIC) or Field-Programmable Gate Array (FPGA). Embodiments can be implemented using hardwired circuitry without software instructions or in combination with software instructions. Thus, the techniques are limited neither to any specific combination of hardware circuitry and software nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving, by a memory device, a firmware update;
   validating, by the memory device, a signature associated with the firmware update;
   copying, by the memory device, an existing firmware image to an archive location, the archive location storing a plurality of firmware images sorted by version identifiers;
   booting, by the memory device, and executing the firmware update; and
   replacing, by the memory device, the firmware update with the existing firmware image stored in the archive location upon detecting an error while booting the firmware update.

2. The method of claim 1, wherein receiving a firmware update comprises receiving a firmware update image and a corresponding version identifier.

3. The method of claim 1, further comprising discarding the firmware update upon determining that the signature is invalid.

4. The method of claim 1, wherein copying the existing firmware image to an archive location comprises writing the existing firmware image to a write-protected region of non-volatile memory.

5. The method of claim 1, wherein copying the existing firmware image to an archive location comprises updating a version mapping, the version mapping associating version numbers with firmware images.

6. The method of claim 1, further comprising iteratively executing a plurality of firmware images until no errors occur while booting a respective firmware image.

7. The method of claim 1, wherein copying the existing firmware image to an archive location comprises pushing the existing firmware image onto a stack.

8. A memory device comprising:
   a non-volatile storage area; and
   a controller configured to:
   receive a firmware update;
   validate a signature associated with the firmware update;

copy an existing firmware image to an archive location in the non-volatile storage area, the archive location storing a plurality of firmware images sorted by version identifiers;

boot and execute the firmware update; and replace the firmware update with the existing firmware image stored in the archive location upon detecting an error while booting the firmware update.

9. The memory device of claim 8, wherein receiving a firmware update comprises receiving a firmware update image and a corresponding version identifier.

10. The memory device of claim 8, the controller further configured to discard the firmware update upon determining that the signature is invalid.

11. The memory device of claim 8, wherein copying the existing firmware image to an archive location comprises writing the existing firmware image to a write-protected region of non-volatile memory.

12. The memory device of claim 8, wherein copying the existing firmware image to an archive location comprises updating a version mapping, the version mapping associating version numbers with firmware images.

13. The memory device of claim 8, the controller further configured to iteratively execute a plurality of firmware images until no errors occur while booting a respective firmware image.

14. The memory device of claim 8, wherein copying the existing firmware image to an archive location comprises pushing the existing firmware image onto a stack.

15. A non-transitory computer-readable storage medium for tangibly storing computer program instructions capable of being executed by a computer processor, the computer program instructions defining steps of:

receiving a firmware update;

validating a signature associated with the firmware update;

copying an existing firmware image to a write-protected archive location, the archive location storing a plurality of firmware images sorted by version identifiers; booting and executing the firmware update; and replacing the firmware update with the existing firmware image stored in the archive location upon detecting an error while booting the firmware update.

16. The non-transitory computer-readable storage medium of claim 15, wherein receiving a firmware update comprises receiving a firmware update image and a corresponding version identifier.

17. The non-transitory computer-readable storage medium of claim 15, the steps further comprising discarding the firmware update upon determining that the signature is invalid.

18. The non-transitory computer-readable storage medium of claim 15, wherein copying the existing firmware image to an archive location comprises writing the existing firmware image to a write-protected region of non-volatile memory.

19. The non-transitory computer-readable storage medium of claim 15, wherein copying the existing firmware image to an archive location comprises updating a version mapping, the version mapping associating version numbers with firmware images.

20. The non-transitory computer-readable storage medium of claim 15, the steps further comprising iteratively executing a plurality of firmware images until no errors occur while booting a respective firmware image.

* * * * *